US007694037B2

(12) United States Patent
Nakatsuka (10) Patent No.: US 7,694,037 B2
(45) Date of Patent: Apr. 6, 2010

(54) INFORMATION PROCESSING APPARATUS AND COMMAND MULTIPLICITY CONTROL METHOD WHEREIN COMMANDS ARE SENT FROM A HOST TO A TARGET USING ISCSI CONTROL PROTOCOL

(75) Inventor: Daiki Nakatsuka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 153 days.

(21) Appl. No.: 12/013,835

(22) Filed: Jan. 14, 2008

(65) Prior Publication Data
US 2008/0228960 A1    Sep. 18, 2008

(30) Foreign Application Priority Data
Mar. 14, 2007  (JP) .............................. 2007-065607

(51) Int. Cl.
*G06F 13/28*   (2006.01)
(52) U.S. Cl. .............................. 710/24; 710/72; 710/73; 710/74; 710/5; 709/230
(58) Field of Classification Search ................... 710/24, 710/72–74, 5; 709/230
See application file for complete search history.

(56) References Cited
U.S. PATENT DOCUMENTS 6,009,275 A * 12/1999  DeKoning et al. .......... 710/220
6,343,324 B1 * 1/2002  Hubis et al. ................. 709/229
6,507,896 B2 * 1/2003  Sanada et al. ............... 711/152
7,069,353 B2   6/2006  Shiraki et al.
2004/0049603 A1 * 3/2004  Boyd et al. ..................... 710/1
2006/0015655 A1 * 1/2006  Zur et al. ........................ 710/5

FOREIGN PATENT DOCUMENTS

JP    2005-322181 A    11/2005
JP    2006-152675 A     5/2006

OTHER PUBLICATIONS

U.S. Appl. No. 11/495,755.

* cited by examiner

*Primary Examiner*—Tammara Peyton
(74) *Attorney, Agent, or Firm*—Sughrue Mion, PLLC

(57) ABSTRACT

Provided are an information processing apparatus and a command multiplicity control method that enable easy and proper control of command multiplicity assigned to each host. The information processing apparatus, which executes processing in accordance with a command sent from each of plural hosts, dynamically determines each host's command multiplicity with respect to the information processing apparatus in accordance with command issue frequency of each host, and sets the determined multiplicity for the host. Accordingly, an information processing apparatus that enables easy and proper control of the command multiplicity assigned to each host can be realized.

11 Claims, 10 Drawing Sheets

| HOST NAME (401) | COMMAND MULTIPLICITY (402) | NUMBER OF CURRENTLY-ACTIVE COMMANDS (403) |
|---|---|---|
| 100A | 10 | 10 |
| 100B | 15 | 15 |
| ... | ... | ... |
| TOTAL | 512 (404) | 411 (405) |

| TOTAL CAPACITY (501) | REMAINING CAPACITY (502) |
|---|---|
| 512 | 10 |

| NUMBER | COMMAND STORAGE ADDRESS | COMMAND LENGTH |
|---|---|---|
| 1 | AAAAAAAA | 64 |
| 2 | BBBBBBBB | 64 |
| 3 | CCCCCCCC | 32 |
| ... | ... | ... |

| NUMBER | RESPONSE STORAGE ADDRESS | RESPONSE LENGTH |
|---|---|---|
| 1 | AAAAAAAA | 64 |
| 2 | BBBBBBBB | 64 |
| 3 | CCCCCCCC | 32 |
| ... | ... | ... |

INFORMATION PROCESSING APPARATUS AND COMMAND MULTIPLICITY CONTROL METHOD WHEREIN COMMANDS ARE SENT FROM A HOST TO A TARGET USING ISCSI CONTROL PROTOCOL

CROSS-REFERENCES TO RELATED APPLICATIONS

This application relates to and claims priority from Japanese Patent Application No. 2007-065607, filed on Mar. 14, 2007, the entire disclosure of which is incorporated herein by reference.

BACKGROUND

1. Field of the Invention

The present invention relates to an information processing apparatus and a command multiplicity control method, and is suited for use in, for instance, a storage system.

2. Description of Related Art

In a storage system in which one or more host computers (hereinafter, referred to as "hosts") and one or more storage apparatuses are connected to each other via a network, each host sends a read command or a write command to the corresponding storage apparatus to read/write the data stored in the storage apparatus.

In such a storage network, the host can normally multiplex a command and send the resultant command to the storage apparatus. Here, command multiplexing indicates that the host continuously sends plural commands such as read commands and write commands without waiting for any response from the storage apparatus. Also, the number of continuously-sent commands is called "multiplicity" (hereinafter referred to as "command multiplicity").

When the command multiplicity is increased, the host's waiting time during sending of plural commands can be decreased, allowing more efficient communication between the host and the storage apparatus. However, the storage apparatus's capacity (e.g., a receive queue area for storing received commands) is finite. Thus, if the command multiplicity is too large, the so-called QUEUE FULL state, where the storage apparatus cannot receive all of the commands, occurs.

Upon occurrence of the QUEUE FULL state, the storage apparatus sends a QUEUE FULL response, which indicates the occurrence of the QUEUE FULL state, to the host. Upon receiving the QUEUE FULL response, the host records errors or suspends command sending, which leads to deterioration of the I/O performance of the entire storage system. Therefore, the storage system requires some sort of mechanism for preventing the QUEUE FULL state in the storage apparatus from occurring.

In light of the above, a technique of setting the maximum value for command multiplicity for each host connected to a storage apparatus has been proposed as a method for preventing the QUEUE FULL state (see JP2005-322181 A).

However, in the technique proposed in JP2005-322181 A, a system administrator is required to determine and set, in advance, command multiplicity for each host. As a result, where plural hosts are connected to a storage apparatus, the above-described technique has a problem in that the operation involving assigning proper command multiplicity to each host and setting the command multiplicity for the host is cumbersome.

In addition, according to the technique disclosed in JP2005-322181 A, in order to change the command multiplicity setting, the system administrator needs to reset the command multiplicity after stopping the host and then needs to restart the host again. Therefore, the technique disclosed in JP2005-322181 A has a problem in that the command multiplicity setting cannot be changed while an application program on the host is in operation, which leads to entire system unavailability.

SUMMARY

The present invention has been made in light of the above, and aims to propose an information processing apparatus and a command multiplicity control method that enable easy and proper control of command multiplicity set for each host.

In order to attain the above aim, according to this invention, provided is an information processing apparatus connected to plural hosts, for executing processing in accordance with a command sent from each host, the information processing apparatus being characterized by including a multiplicity control unit that dynamically determines command multiplicity for the command to be assigned to the host in accordance with command issue frequency of the host and sets the determined multiplicity for the host.

According to the invention, provided is a command multiplicity control method for controlling command multiplicity for each of plural hosts with respect to an information processing apparatus for executing processing in accordance with a command sent from each host, the method characterized by including: a first step in which the information processing apparatus dynamically determines the command multiplicity assigned to the host in accordance with command issue frequency of the host; and a second step in which the information processing apparatus sets the determined multiplicity for the host.

According to the invention, the command multiplicity assigned to the host is dynamically determined in accordance with the command issue frequency of the host, and the determined command multiplicity is set for the host. As a result, the command multiplicity assigned to each host can be controlled easily and properly.

DETAILED DESCRIPTION OF PREFERRED EMBODIMENTS

Embodiments of the present invention will be described in detail with reference to the drawings.

(1) First Embodiment (1-1) Configuration of Storage System

Figure 1:
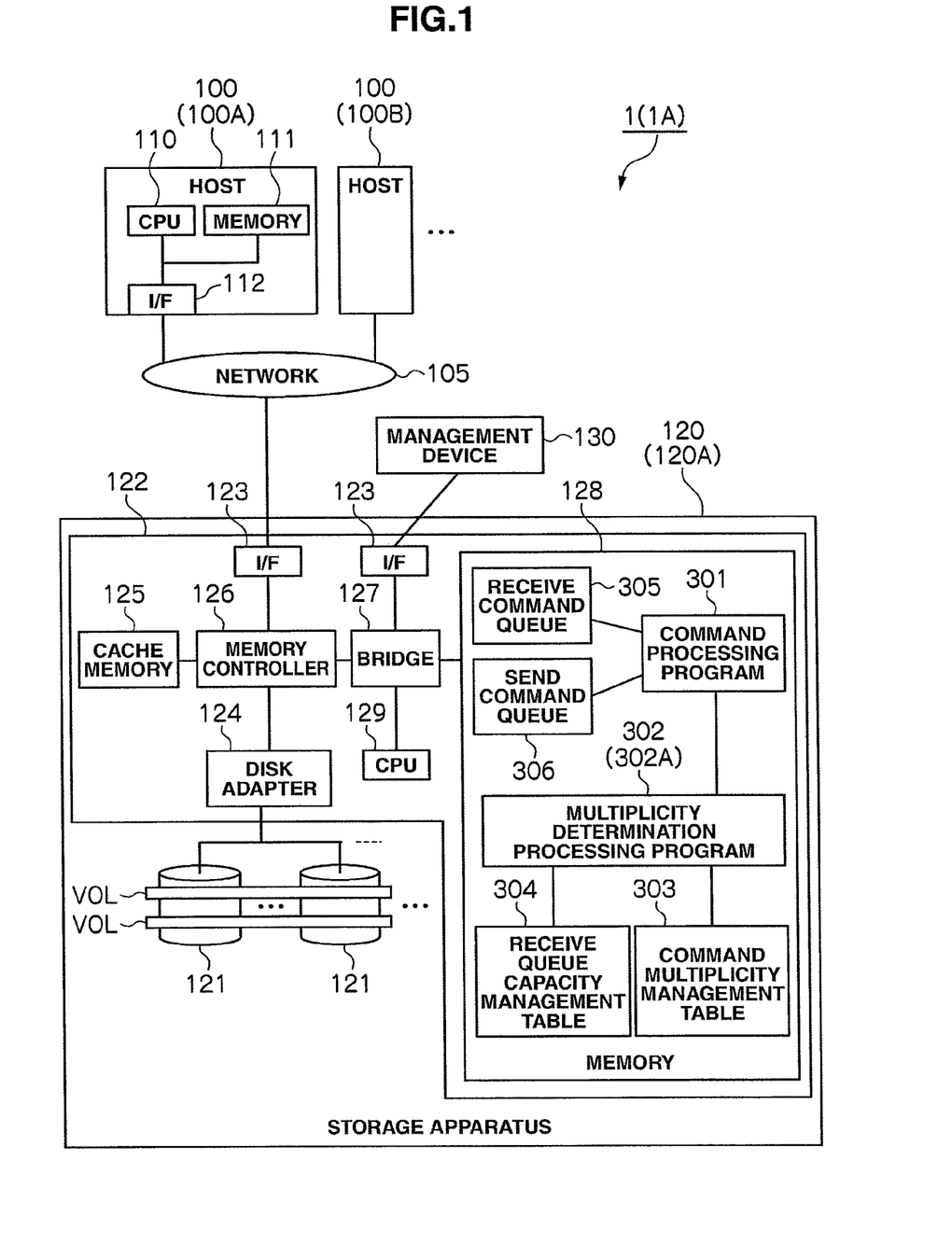
FIG. 1 is a block diagram showing the overall configuration of a storage system according to an embodiment of the invention.

In FIG. 1, reference numeral 1 represents a storage system as a whole according to the first embodiment. The storage system is configured so that: hosts 100 and a storage apparatus 120 are connected to each other via a network 105; and a management device 130 is connected to the storage apparatus 120.

Each host 100 is an general computer which includes a CPU (Central Processing Unit) 110, memory 111, and an interface 112. The CPU 110 is a processor that performs operation control for the entire host 100. The CPU 110 executes software stored in the memory 111, thereby causing the entire host 100 to execute various kinds of processing. The memory 111 is used to store various kinds of software, and is also used as work memory for the CPU 110. The interface 112 is designed to allow the CPU 110 to communicate with the storage apparatus 120 via the network 105. Note that one or more hosts 100 exist in the storage system 1; and the hosts 100 are hereinafter denoted as "host 100A", "host 100B", etc., by attaching the letters "A", "B", etc., to the reference numeral "100" in order to discriminate between the hosts 100.

The storage apparatus 120 is composed of a plurality of disk devices 121 and a control unit 122 that controls the disk devices 121.

The disk devices 121 are composed of, for instance, expensive disk drives such as FC (Fibre Channel) disks or inexpensive disk drives such as FATA (Fibre Attached Technology Adapted) disks, SATA (Serial AT Attachment) disks, or optical disk drives. One or more logical volumes (hereinafter referred to as "logical volumes") VOL are defined in a storage area provided by one or more disk devices 121. Then, data from the host 100 is read/written in blocks of a specified size from/to these logical volumes VOL.

Each logical volume VOL is assigned a unique identifier (LUN: Logical Unit Number). In this embodiment, that identifier and a unique number (LBA: Logical Block Address) allocated to each block are combined to form an address, and data is input or output by designating the relevant address.

The control unit 122 is composed of a plurality of interfaces 123, a disk adapter 124, cache memory 125, a memory controller 126, a bridge 127, local memory 128, and a CPU 129.

Each interface 123 is an interface to the network 105 or the management device 130, and receives/sends write data, read data, various commands, and the like from/to the host 100 or the management device 130. Note that, in this embodiment, the communication between the interface 123 and each host 100 is implemented in accordance with a protocol based on the iSCSI (internet Small Computer System Interface) standard.

The disk adapter 124 is an interface to the disk devices 121, and receives/sends write data, read data, various commands, and the like from/to the disk device(s) 121 in accordance with, for example, Fibre Channel Protocol.

The cache memory 125 is composed of, for example, non-volatile semiconductor memory, and is used for temporarily storing the commands from the hosts 100 or the data read from/written to the disk device(s) 121. The memory controller 126 controls data transfer between the cache memory 125 and the local memory 128 and between the cache memory 125 and the disk adapter 124. Further, the bridge 127 executes filing processing, etc., between the memory controller 126 and the CPU 129, and between the memory controller 126 and the local memory 128.

The memory 128 is used to store various control programs and various kinds of control information, and is also used as work memory for the CPU 129. The CPU 129 is a processor that controls input/output of data to/from the disk device(s) 121 in response to the read command or write command sent from the host 100, and controls the interfaces 123, the disk adapter 124, the memory controller 126, etc., based on the various control programs and various kinds of control information stored in the local memory 128.

The management device 130 is a computer device equipped with information processing resources such as a CPU and memory, and is composed of, for example, a personal computer or a workstation. The management device 130 is provided with a GUI (Graphical User Interface) to control various settings for the storage apparatus 120, a display device for displaying various kinds of information, and input devices such as a keyboard and a mouse with which a system administrator performs various operations and inputs various settings. The management device 130 executes various kinds of processing in accordance with various commands inputted via the input devices.

Note that FIG. 1 shows an example where only one storage apparatus 120 exists in the storage system 1; however, plural storage apparatuses 120 may exist.

(1-2) Command Multiplicity Control Function

Next, an explanation will be made of a command multiplicity control function installed in the storage apparatus 120. First, the iSCSI standard control protocol for the number of simultaneously-issued commands will be described below.

Figure 2:
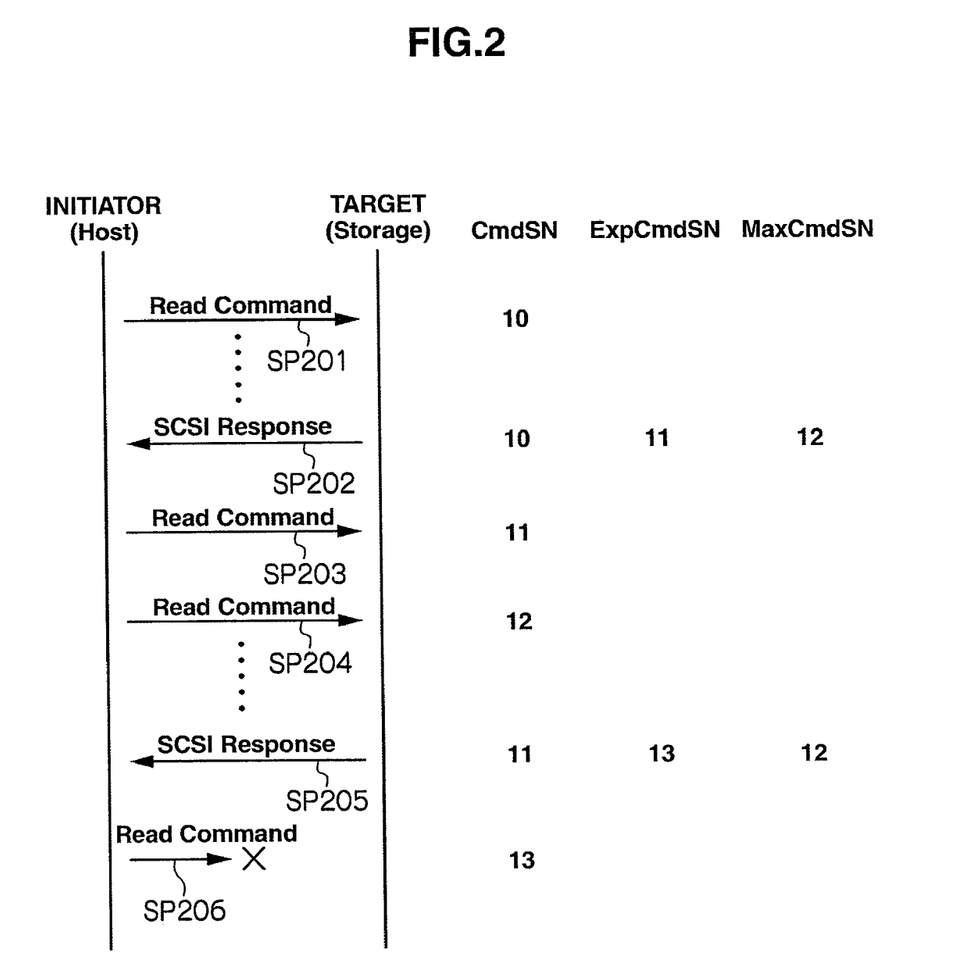
FIG. 2 is a ladder chart explaining a system for controlling the number of simultaneously-issued commands, within the iSCSI standard.

The iSCSI standard includes a mechanism for having a target control the number of commands simultaneously issued by an initiator by using the following parameters: "CmdSN", "ExpCmdSN", and "MaxCmdSN."

Specifically, as shown in FIG. 2, the command issued by the initiator is given a "CmdSN" number that is an identifier for the command. Also, a response to the command, which is sent from the target to the initiator, is given, in addition to the "CmdSN," the "ExpCmdSN", which specifies the "CmdSN" of a command to be issued next by the initiator, and the "MaxCmdSN", which specifies the maximum "CmdSN" that the initiator can give to the command. At this point, when the "ExpCmdSN" is larger than the "MaxCmdSN", in other words, where the condition "ExpCmdSN">"MaxCmdSN" is satisfied, the initiator cannot send the next command.

For instance, assume that, as shown in FIG. 2, the initiator sends a command with "10" as it's "CmdSN" (SP201), and in response to this, the target sends a response, which is given "10" as it's "CmdSN", "11" as it's "ExpCmdSN", and "12" as it's "MaxCmdSN", to the initiator (SP202). In this case, the "ExpCmdSN" is smaller than the "MaxCmdSN", and so the initiator can send commands sequentially to the target until the "CmdSN" becomes "12" (SP203, SP204).

After that, the "ExpCmdSN", which is given to the response command sent from the target to the initiator, increases sequentially. Then, when the "ExpCmdSN" value is larger than "12" ("13" in FIG. 2) (SP205), the initiator is no longer able to send the next command to the initiator (SP206).

In the storage system 1 according to this embodiment, the storage apparatus 120 has a command multiplicity control function that dynamically changes the command multiplicity assigned to each host 100 in accordance with the command issue frequency of the host 100, and sets the changed command multiplicity for the host 100 by using the above-described iSCSI standard control protocol for controlling the number of simultaneously-issued commands.

Figure 3:
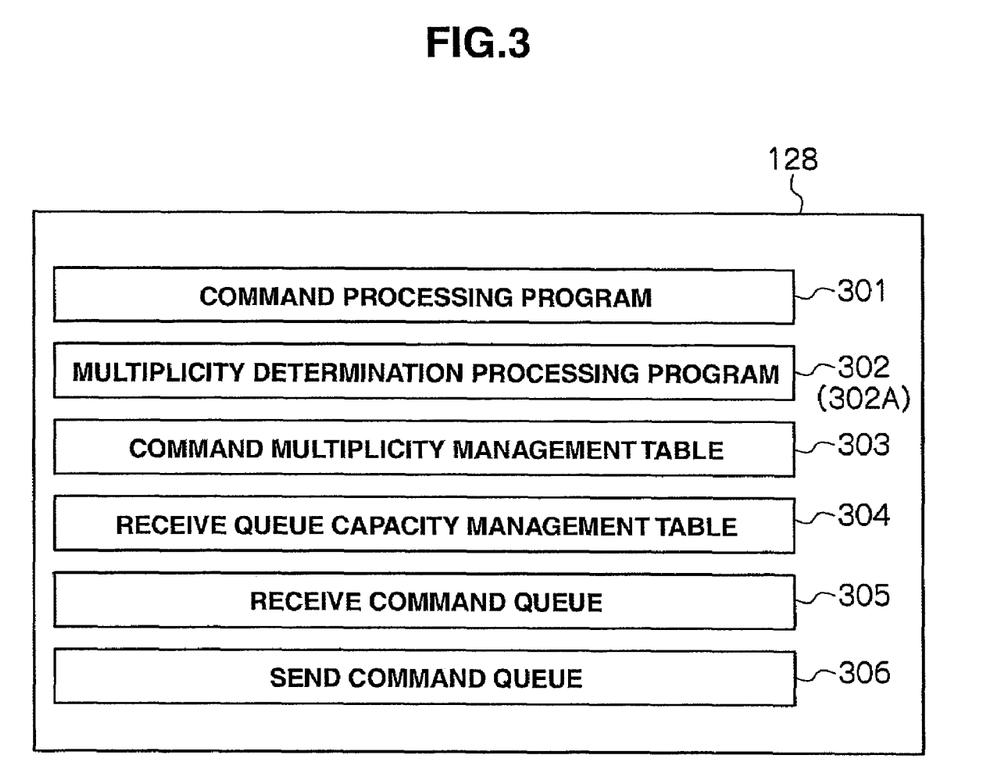
FIG. 3 is a conceptual diagram explaining various control programs and various kinds of information which are stored in local memory.

FIG. 3 shows control programs and control information that are related to the above-stated command multiplicity control function, from among the various control programs and various kinds of control information stored in the local memory 128 of the storage apparatus 120. As shown in FIG. 3, a command processing program 301, a multiplicity determination processing program 302, a command multiplicity management table 303, and a receive queue capacity management table 304 are stored in the local memory 128. The local memory 128 is also provided with a receive command queue 305 and a send command queue 306 that show the order of commands and responses received/sent from/to the host 100 via the interface 123 (FIG. 1).

The command processing program 301 is a program for executing the processing in accordance with the multiplexed command to be sent from the host 100 and sending the processing result (response) to the host 100. Also, the multiplicity determination processing program 302 is a program for dynamically changing the command multiplicity assigned to each host 100 in accordance with the command issue frequency of the host 100. The processing based on the multiplicity determination processing program 302 will be described later. Note that explanation may hereinafter be given by referring to the "command processing program 301" and the "multiplicity determination processing program 302" as the agents of various kinds of processing; however, it is obvious that the CPU 129 actually executes the processing based on the command processing program 301 or the multiplicity determination processing program 302.

Figure 4:
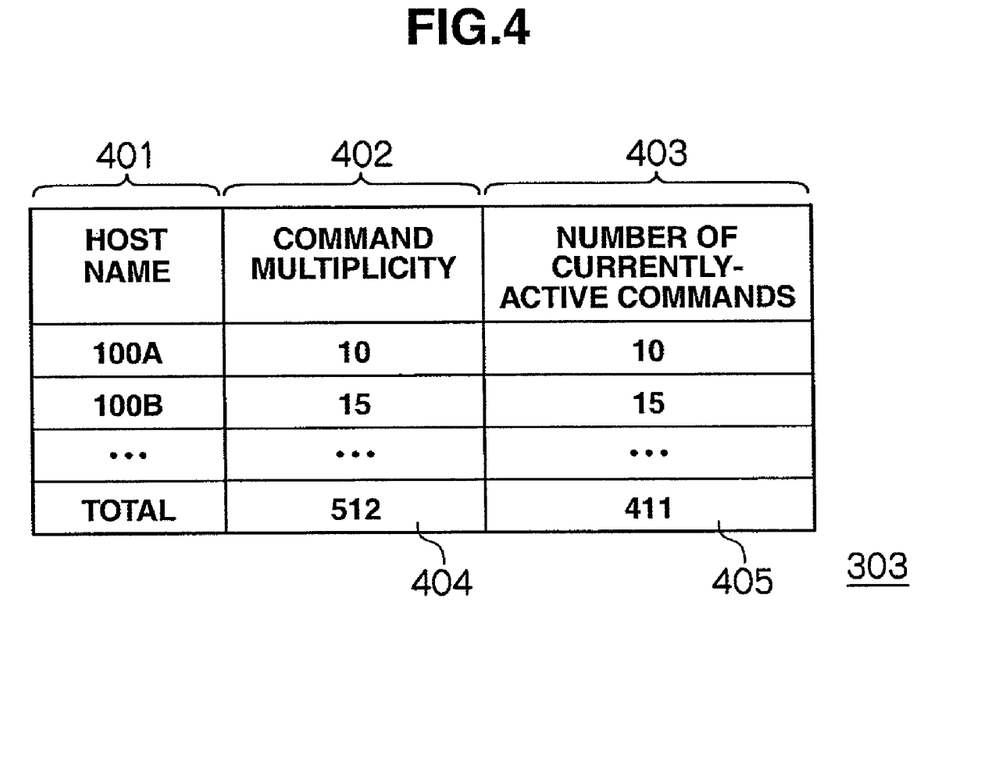
FIG. 4 is a conceptual diagram explaining a command multiplicity management table.

The command multiplicity management table 303 is a table for managing the command multiplicity assigned to each host 100 and the number of currently-active commands for each host 100. As shown in FIG. 4, the command multiplicity management table 303 includes a host name column 401, a command multiplicity column 402, and a column 403 for the number of currently-active commands.

The host name column 401 stores the identifier for each host 100 connected to the storage apparatus 120, and the command multiplicity column 402 stores the command multiplicity assigned to each host 100. Also, the column 403 for the number of currently-active commands stores the number of commands for which no response has been made by the storage apparatus 120, i.e., commands, from among the commands sent from the host 100, that are currently active or that have not been active yet (hereinafter referred to as the "number of currently-active commands").

Further, a total command multiplicity column 404 and a column 405 for the total number of currently-active commands are respectively provided on the last line of the command multiplicity column 402 and the column 403 for the number of currently-active commands in the command multiplicity management table 303. The total command multiplicity column 404 stores the total command multiplicity assigned to the respective hosts 100 and the column 405 for the total number of currently-active commands stores the total number of currently-active commands for the respective hosts 100.

Figure 5:
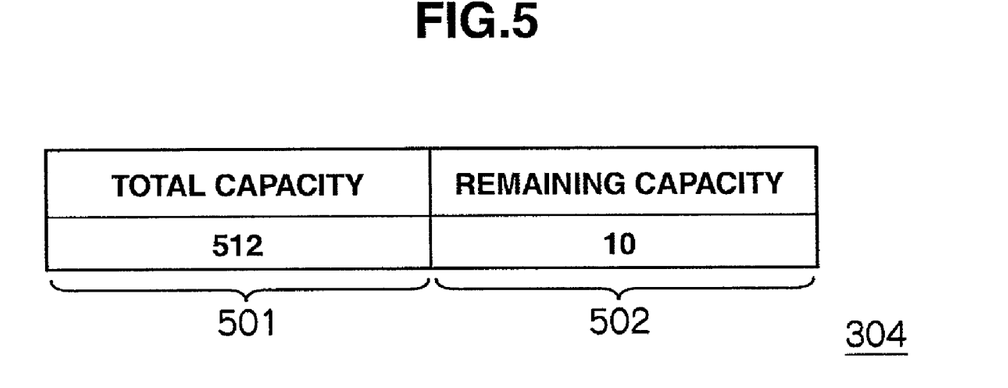
FIG. 5 is a conceptual diagram explaining a receive queue capacity management table.

The receive queue capacity management table 304 is a table used for monitoring the free capacity of the receive command queue 305 (described later), and is composed of a total capacity column 501 and a remaining capacity column 502, as shown in FIG. 5. The total capacity column 501 stores the maximum number of commands that can be stored (capable of being stored) in the receive command queue 305, and the remaining capacity column 502 stores the remaining capacity that corresponds to the current free capacity (the number of commands that can be received). Therefore, the FIG. 5 example shows that the maximum number of commands that can be stored in the receive command queue 305 is "512" and that the current free capacity is "10" relative to that maximum number of commands.

Figure 6:
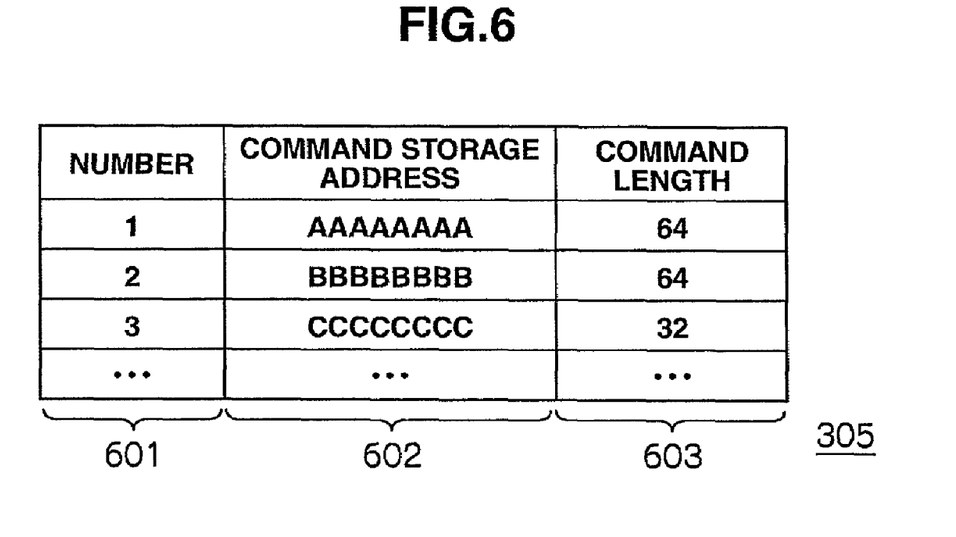
FIG. 6 is a conceptual diagram explaining a receive command queue.

The receive command queue 305 is a memory area with a FIFO (First In First Out) configuration, and is used when the command received by the interface 123 is forwarded to the command processing program 301. Every time the receive command queue 305 receives a command, it stores a command number 601, a command storage address 602, and a command length 603, which have been assigned to the command, as shown in FIG. 6.

The flow of command forwarding processing using the receive command queue 305 will be briefly described below. After receiving a command, the interface 123 stores the received command in the cache memory 125. Then, the interface 123 adds a new entry to the end (the last line) of the receive command queue 305, and writes a head address of the command in the cache memory 125, which has stored the received command, and the command length respectively to the new entry as the command storage address 602 and the command length 603. Then, when executing command processing, the command processing program 301 refers to the head (first line) entry of the receive command queue 305 to identify the head address of the command in the cache memory 125 that has stored the command, and then, deletes the entry it referred to. The details of the above operation will be described later.

Figure 7:
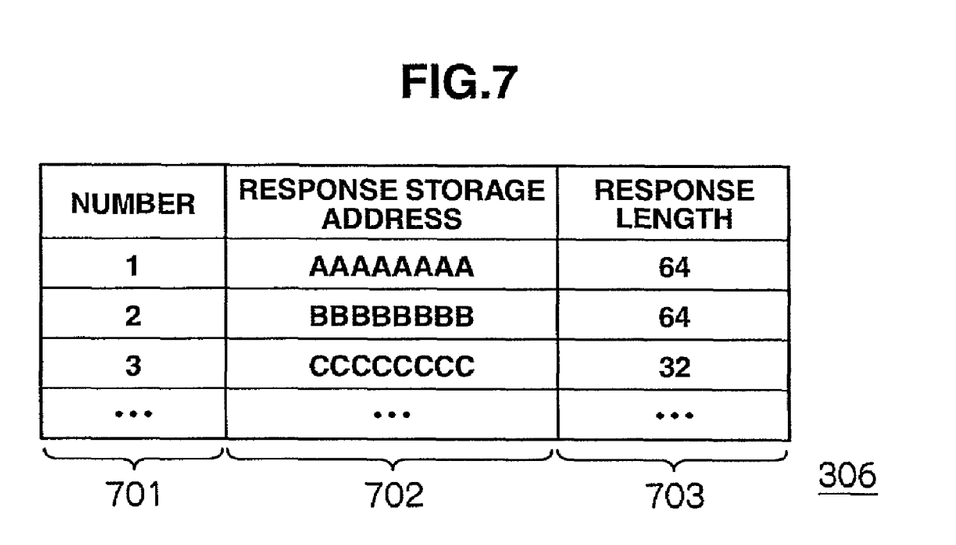
FIG. 7 is a conceptual diagram explaining a send command queue.

The send command queue 306 is a memory area with a FIFO (First In First Out) configuration, and is used when the response generated by the command processing program 301 is forwarded to the interface 123. Every time the send command queue 306 receives a command, it stores a response number 701, a response storage address 702, and a response length 703, which have been assigned to the response, as shown in FIG. 7.

The flow of response forwarding processing using the send command queue 306 will be briefly described below. After generating a response, the command processing program 301 stores the response in the cache memory 125. Then, the command processing program 301 adds a new entry to the end (the last line) of the send command queue 306, and writes the head address of the response in the cache memory 125, which has stored the response, and the response length respectively to the new entry as the response storage address 702 and the response length 703. Then, when executing response sending processing, the interface 123 refers to the head (the first line) entry of the send command queue 306 to identify the head address of the response in the cache memory 125 that has stored the response, and then deletes the entry it referred to. The details of the above operation will be described later.

Next, the flow of processing executed by the storage apparatus 120 for receiving a command from the host 100 and sending the corresponding response to the host 100 will be explained below with reference to FIG. 8.

After receiving a command issued by the host 100 (SP801), the interface 123 refers to the receive queue capacity management table 304 (FIG. 5) to check the free capacity of the receive command queue 305 (SP802). If the free capacity of the receive command queue 305 is "0" (i.e., if the receive command queue 305 cannot store a new command), the interface 123 sends a QUEUE FULL response to the host 100 that has sent the command, and discards the command received in step SP801 (SP803).

On the other hand, if the free capacity of the receive command queue 305 is 1 or more, the interface 123 stores the received command in the cache memory 125 (SP804). After that, the interface 123 writes the head address of the command in the cache memory 125, which has stored the command, and the command length to the receive command queue 305 as described above (SP805). Successively, the interface 123 sends an interruption request to the CPU 129 to notify the CPU 129 of its reception of the command (SP806).

After receiving the interruption request, the CPU 129 executes the command processing program 301. The command processing program 301 first fetches a plurality of entries starting from the head of the receive command queue 305. The command processing program 301 also identifies the location of the corresponding command stored in the cache memory 125, for each fetched entry, based on the entry content, reads the command from the cache memory 125, and transfers it to the local memory 128 by means of DMA (Direct Memory Access) (SP807).

Next, the command processing program 301 adds the content of the command, which has been DMA-transferred to the local memory 128, to a command management table (not shown in the drawing). Then, the command processing program 301 calls the multiplicity determination processing program 302 by using, as an argument, the host name of the host 100 that has issued the command added to the command management table (SP808).

The called multiplicity determination processing program 302 executes processing for updating the number of currently-active commands in the command multiplicity management table 303 in order to increase the number of the currently-active commands for the entry of the host 100, which has sent the added command, by "1" (SP809). After finishing the processing for updating the number of currently-active commands, the multiplicity determination processing program 302 notifies the command processing program 301 of the completion of the update processing (hereinafter referred to as "processing completion notification") (SP810). The details of the processing for updating the number of currently-active commands will be described later.

After receiving the processing completion notification, the command processing program 301 executes the corresponding command (SP811). For example, if the command is a write command or a read command, the command processing program 301 reads out the command from the command management table and sends the command to the disk adapter 124. Also, if the command is a write command, the command processing program 301 controls the memory controller 126 so that the write data, which has been sent from the host 100 together with the command and temporarily stored in the cache memory 125, is sent to the disk adapter 124. As a result, the disk adapter 124 executes processing for inputting/outputting data to/from the disk device(s) 121 in accordance with the command.

On the other hand, the command processing program 301 calls the multiplicity determination processing program 302 again after the completion of the command processing in step SP811 (SP812). Then, the called multiplicity determination processing program 302 executes the command multiplicity determination processing for determining the new command multiplicity to be assigned to the host 100 in accordance with the command multiplicity assigned to the corresponding host 100 and the number of currently-active commands in the command multiplicity management table 303 (SP813). Incidentally, the details of the command multiplicity determination processing will be described later. The multiplicity determination processing program 302 also notifies the command processing program 301 of the determined command multiplicity for the host 100 (SP814).

After receiving the above notification, the command processing program 301 generates a response to be sent to the corresponding host 100 based on the processing results (such as read data in the case of read processing, or a success or failure result for processing in the case of write processing) in step SP811. When this happens, the command processing program 301 sets, as the "MaxCmdSN" described with reference to FIG. 2, the command multiplicity sent by the multiplicity determination processing program 302 in step SP814, for the command (SP815).

Also, the command processing program 301 stores the thus generated response in the cache memory 125 (SP816), and then stores the head address of the response in the cache memory 125, which has stored the response, and the response length, in the send command queue 306 as described above (SP817). Subsequently, the command processing program 301 sends an interruption request to the interface 123, notifying the interface 123 of the completion of preparation for response sending (SP818).

After receiving the interruption request, the interface 123 refers to the send command queue 306 to identify the storage area on the cache memory 125 that has stored the response, and then reads out the response from the identified storage area (SP819). Then, the interface 123 sends the read-out response to the corresponding host 100 (SP820).

Thereafter, the host 100, which has received the response, multiplexes the command so that the resultant multiplicity value will not exceed the command multiplicity equal to the "MaxCmdSN" set in the response as assigned by the multiplicity determination processing program 302; and the host 100 then sends the multiplexed command to the storage apparatus 120.

Figure 8:
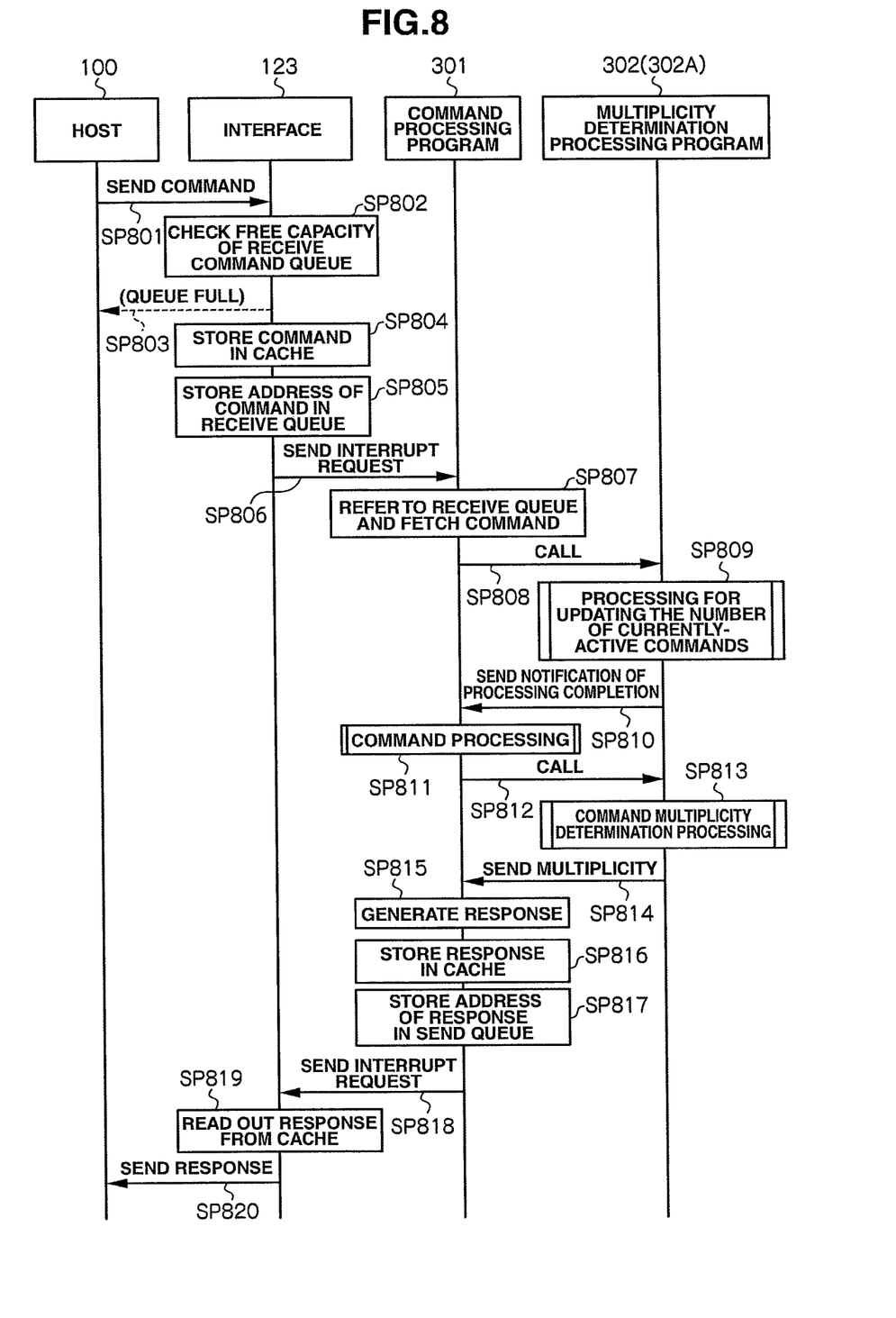
FIG. 8 is a ladder chart explaining a command multiplicity control function installed in a storage apparatus.
Figure 9:
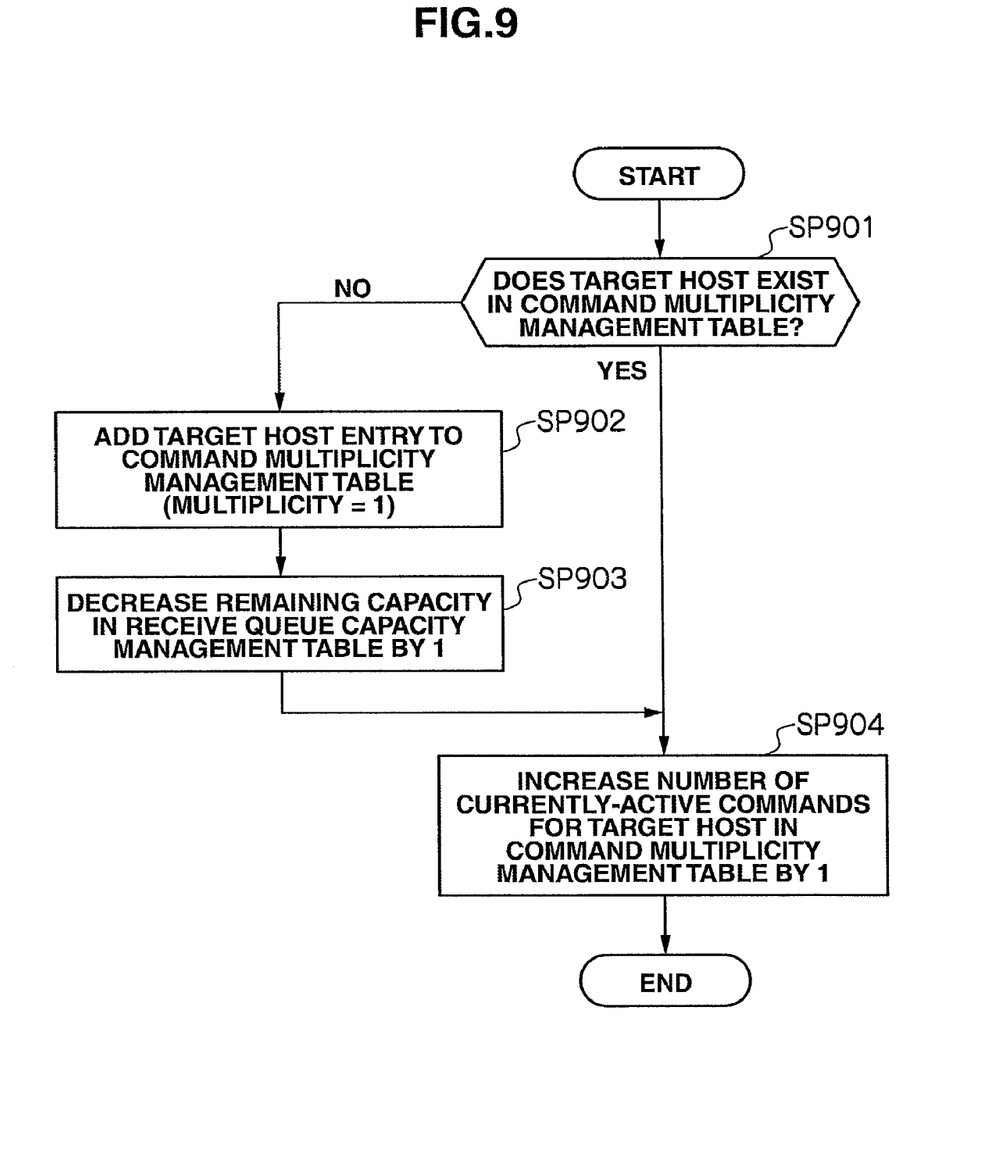
FIG. 9 is a flowchart illustrating the specific content of processing for updating the number of currently-active commands according to the first embodiment.

Here, FIG. 9 is a flowchart illustrating the specific content of the processing for updating the number of currently-active commands, which has been described regarding step SP809 in FIG. 8.

When the command processing program 301 calls the multiplicity determination processing program 302 (step SP808 in FIG. 8), the multiplicity determination processing program 302 searches the command multiplicity management table 303 in accordance with the host name given as the argument (for example, the host 100A), thereby checking whether or not the host 100A entry, the target in this example (hereinafter, referred to as the "target host 100A"), exists in the command multiplicity management table 303 (SP901).

If the multiplicity determination processing program 302 successfully finds the target host 100A entry, it proceeds to step SP904 described later; meanwhile, if the multiplicity determination processing program 302 fails to find the entry, it adds the target host 100A entry to the command multiplicity management table 303, and also stores "1" in the relevant command multiplicity column 402 (FIG. 4) for the added entry and "0" in the relevant column 403 for the number of currently-active commands for the added entry, respectively (SP902). As a result, the target host 100A is registered with an initial multiplicity of "1" in the command multiplicity management table 303.

Subsequently, the multiplicity determination processing program 302 decreases the free capacity, which is stored in the remaining amount column 502 (FIG. 5) of the receive queue capacity management table 304, by "1" (SP903), and increases the number of currently-active commands, which is stored in the column 403 (FIG. 4) for the number of currently-active commands for the target host 100A entry in the command multiplicity management table 303, by "1" (SP904). Then, the multiplicity determination processing program 302 terminates the processing for updating the number of currently-active commands.

Figure 10:
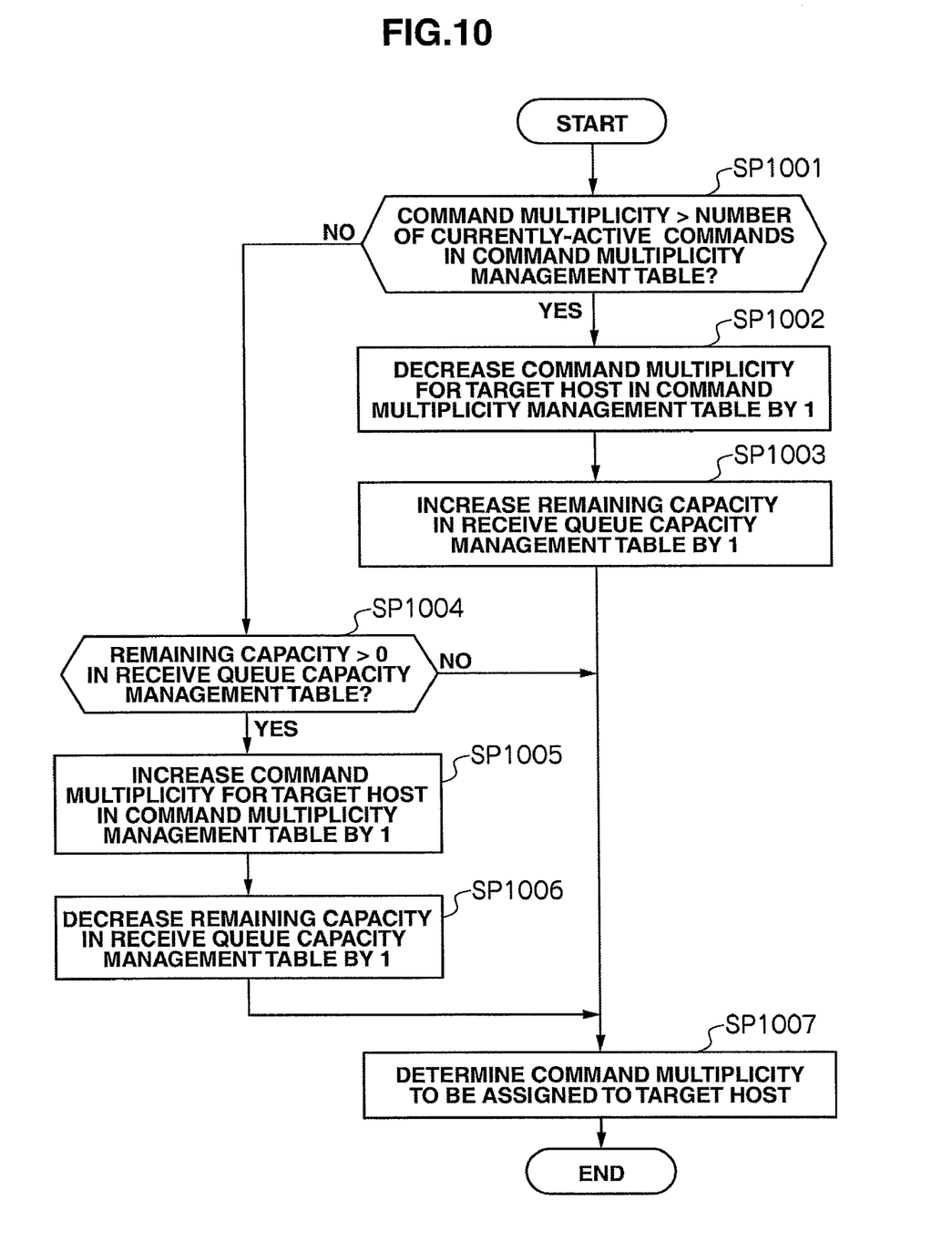
FIG. 10 is a flowchart illustrating the specific content of command multiplicity determination processing according to the first embodiment.

Next, the command multiplicity determination processing described regarding step SP813 in FIG. 8 will be explained in detail with reference to FIG. 10. It will be assumed below that the host name of the target host given as the argument to the multiplicity determination processing program 302 by the command processing program 301 is the host 100A.

When the command processing program 301 calls the multiplicity determination processing program 302 (step SP812 in FIG. 8), the multiplicity determination processing program 302 first scans the command multiplicity management table 303 to identify the target host 100A entry in the command multiplicity management table 303. The multiplicity determination processing program 302 also judges whether or not the command multiplicity stored in the command multiplicity column 402 for the entry is larger than the number of currently-active commands stored in the column 403 for the number of currently-active commands for the entry (SP1001).

Obtaining a positive result for this judgment means that the command multiplicity currently assigned to the target host 100A is larger than the command multiplicity that is actually needed by the target host 100A at this point. Therefore, in this situation, the QUEUE FULL state can be considered as something that may not occur for the target host 100A even if the command multiplicity assigned to the target host 100A is decreased by only "1."

Therefore, the multiplicity determination processing program 302 decreases the command multiplicity for the target host 100A in the command multiplicity management table 303 by "1" (SP1002), and also increases the free capacity stored in the remaining amount column 502 of the receive queue capacity management table 304 by "1" (SP1003). Then, the multiplicity determination processing program 302 proceeds to step SP1007.

On the contrary, obtaining a negative result for the judgment mentioned above means that the command multiplicity currently assigned to the target host 100A is smaller than the command multiplicity that is actually needed by the target host 100A at this point. Therefore, in this situation, there is the possibility that the QUEUE FULL state may occur for the target host 100A, unless the command multiplicity assigned to the target host 100A is increased.

Accordingly, the multiplicity determination processing program 302 refers to the remaining amount column 502 of the receive queue capacity management table 304, and judges whether or not the receive command queue 305 currently has free capacity (i.e., whether or not the condition "free capacity>0" is satisfied) (SP1004).

If the multiplicity determination processing program 302 obtains a negative result for this judgment, it proceeds to step SP1007. Meanwhile, if the multiplicity determination processing program 302 obtains a positive result, it increases the command multiplicity for the target host 100A in the command multiplicity management table 303 by "1" (SP1005), and also decreases the free capacity stored in the remaining amount column 502 of the receive queue capacity management table 304 by "1" (SP1006). Then, the multiplicity determination processing program 302 proceeds to step SP1007.

After proceeding to step SP1007, the multiplicity determination processing program 302 determines the command multiplicity, which has been decreased/increased in step SP1002 or step SP1005, as the command multiplicity to be assigned to the target host 100A. Then, the multiplicity determination processing program 302 terminates the command multiplicity determination processing.

As described above, in the storage system 1 according to this embodiment, the command multiplicity to be assigned to the host 100 is dynamically determined in accordance with the command issue frequency of the host 100, and the determined command multiplicity is set for the host 100. Thus, assignment and setting of the command multiplicity for each host 100 can be performed properly and easily. In this case, it is not necessary to suspend the host 100 when setting or changing the command multiplicity for each host 100. Therefore, the usability of the entire storage system 1 can be improved.

(2) Second Embodiment

In FIG. 1, reference symbol 1A represents a storage system according to the second embodiment. The storage system 1A is configured in the same manner as the storage system 1 according to the first embodiment, except that the content of the processing for updating the number of currently-active commands (step SP809 in FIG. 8) and the command multiplicity determination processing (step SP813 in FIG. 8) for the storage system 1A based on a multiplicity determination processing program 302A stored in the local memory 128 of a storage apparatus 120A are different from those in the storage system 1.

Figure 11:
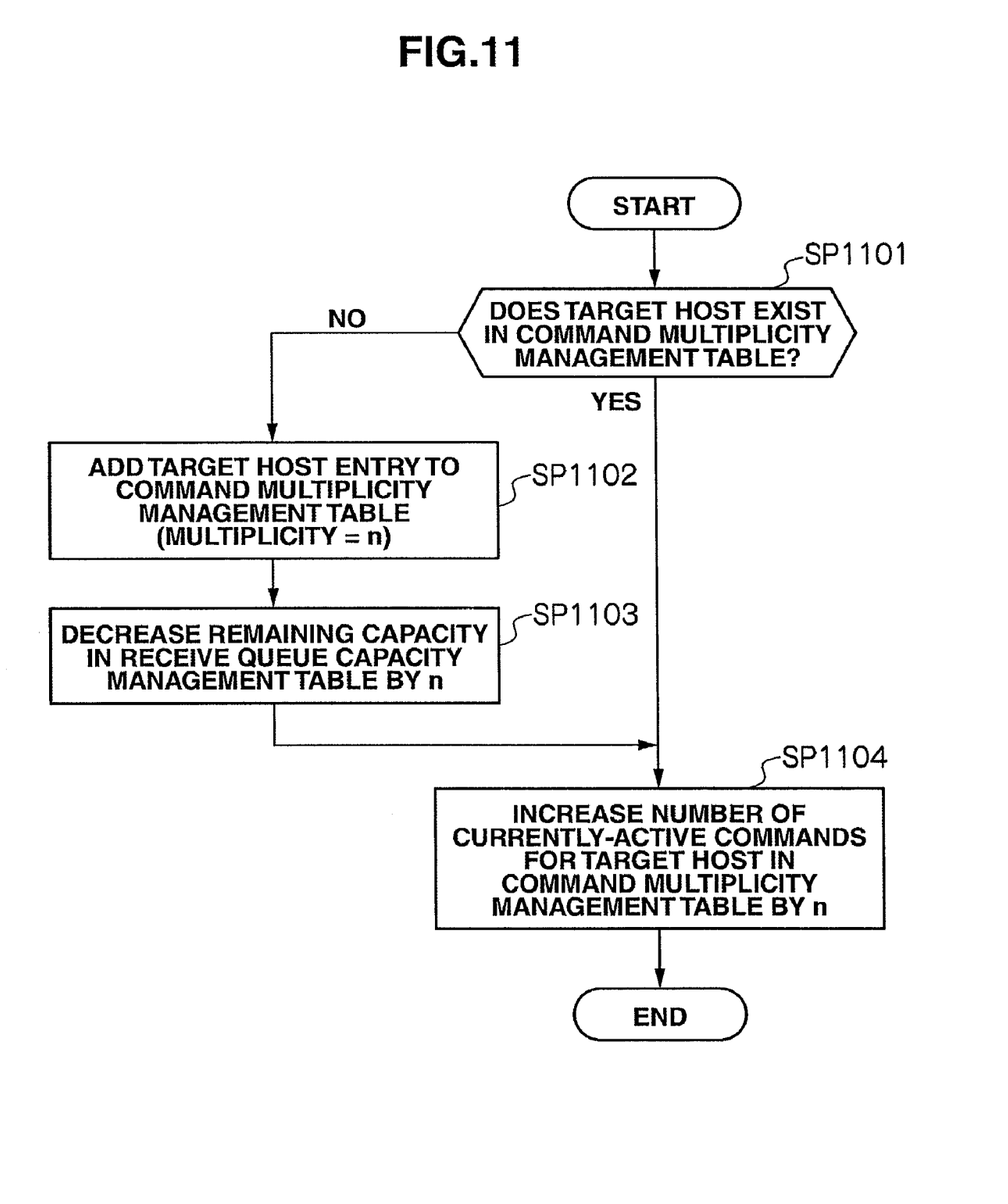
FIG. 11 is a flowchart illustrating the specific content of processing for updating the number of currently-active commands according to the second embodiment.

FIG. 11 is a flowchart illustrating the specific content of the processing for updating the number of currently-active commands according to the second embodiment. Note that reference symbol "n" hereinafter represents the value that a system administrator sets in the storage apparatus 120 using the management device 130.

When the command processing program 301 calls the multiplicity determination processing program 302A (step SP808 in FIG. 8), the multiplicity determination processing program 302A searches the command multiplicity management table 303 based on the host name of the target host (for example, the host 100A) given as an argument, and checks whether or not the target host 100A entry exists in the command multiplicity management table 303 (SP1101).

If the multiplicity determination processing program 302A successfully finds the target host 100A entry, it proceeds to step SP1104 (described later). On the other hand, if the multiplicity determination processing program 302A fails to find the entry, it adds the target host 100A entry to the command multiplicity management table 303, and also stores "n" in the multiplicity column 402 for the added entry and "0" in the column 403 for the number of currently-active commands (SP1102). As a result, the target host 100A is registered with an initial multiplicity of "n" in the command multiplicity management table 303.

Sequentially, the multiplicity determination processing program 302A decreases the free capacity stored in the remaining amount column 502 (FIG. 5) of the receive queue capacity management table 304 by "n" (SP1103), and further increases the number of currently-active commands stored in the column 403 (FIG. 4) for the number of currently-active commands for the target host 100A entry in the command multiplicity management table 303 by "n" (SP1104). Then, the multiplicity determination processing program 302A terminates the processing for updating the number of currently-active commands.

Figure 12:
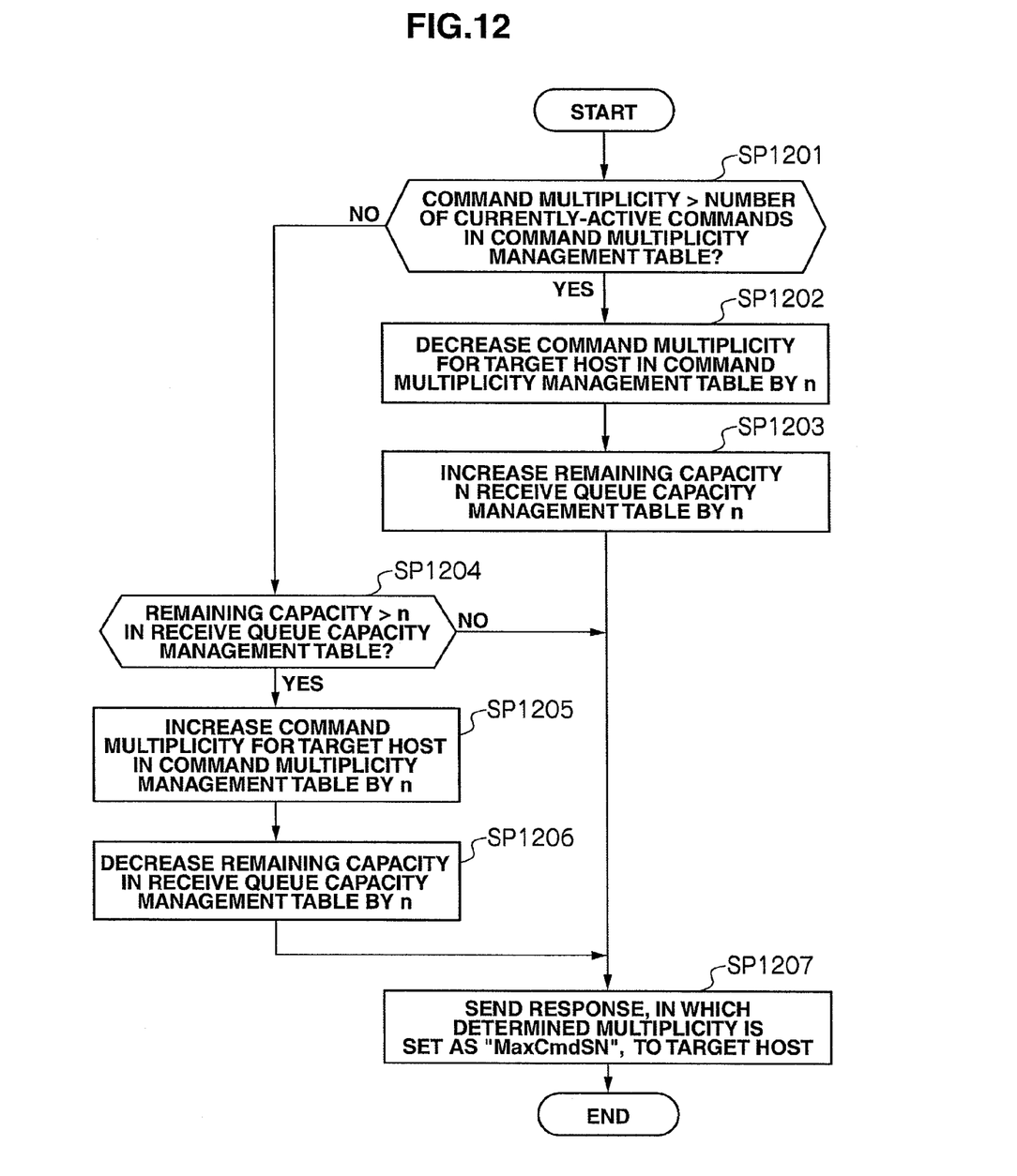
FIG. 12 is a flowchart illustrating the specific content of command multiplicity determination processing according to the second embodiment.

FIG. 12 is a flowchart illustrating the content of the command multiplicity determination processing according to the second embodiment. It will be assumed below that the host name of the target host given as the argument to the multiplicity determination processing program 302A by the command processing program 301 is the host 100A.

When the command processing program 301 calls the multiplicity determination processing program 302A (step SP812 in FIG. 8), the multiplicity determination processing program 302A first scans the command multiplicity management table 303 to identify the target host 100A entry in the command multiplicity management table 303. The multiplicity determination processing program 302A also judges whether or not the command multiplicity stored in the command multiplicity column 402 for the entry is larger than the number of currently-active commands stored in the column 403 for the number of currently-active commands for that entry (SP1201).

If the multiplicity determination processing program 302A obtains a positive result for this judgment, it decreases the command multiplicity for the target host 100A in the command multiplicity management table 303 by "n" (SP1202), and also increases the free capacity stored in the remaining amount column 502 of the receive queue capacity management table 304 by "n" (SP1203). After that, the multiplicity determination processing program 302A proceeds to step SP1207.

On the other hand, if the multiplicity determination processing program 302A obtains a negative result for the judgment, it refers to the remaining amount column 502 of the receive queue capacity management table 304, and judges whether or not the free capacity of the receive command queue 305 is larger than "n" (whether or not the condition "free capacity>n" is satisfied) (SP1204).

If the multiplicity determination processing program 302A obtains a negative result for this judgment, it proceeds to SP1207. Meanwhile, if obtains a positive result, it increases the command multiplicity for the target host 100A in the command multiplicity management table 303 by "n" (SP1205), and also decreases the free capacity stored in the remaining amount column 502 of the receive queue capacity management table 304 by "n" (SP1206). Then, the multiplicity determination processing program 302A proceeds to step SP1207.

Upon proceeding to step SP1207, the multiplicity determination processing program 302A determines the command multiplicity, which has been decreased/increased in step SP1202 or step SP1205, and sets it as the command multiplicity to be assigned to the target host 100A. Then, the multiplicity determination processing program 302A terminates the command multiplicity determination processing.

As described above, in the storage system 1A according to this embodiment, the command multiplicity assigned to each host 100 is increased/decreased by "n". As a result, while the command multiplicity assigned to each host 100 is changed only gradually in the first embodiment, according to the second embodiment, the command multiplicity assigned to each host 100 can be greatly changed in accordance with the setting made by the system administrator in the storage system 1A.

(3) Other Embodiments

The above-described embodiments have been explained for the case where the multiplicity control unit, which dynamically determines the command multiplicity assigned to the host 100 in accordance with the command issue frequency of the host 100 and sets the determined command multiplicity for the host 100, is composed of the command processing program 301, the multiplicity determination processing program 302, and the CPU 129 that executes both the programs. However, this invention is not limited to the above case, and wide variety of other configurations can be utilized in the invention.

Specifically, the aforementioned embodiments have been described for the case where the command processing unit for processing the command sent from the host 100 and the multiplicity determination processing unit for determining the command multiplicity assigned to the host 100 in accordance with the command issue frequency of the host 100 constitute software configurations. However, these units may be hardware configurations.

Also, the aforementioned embodiments have been explained for the case where the interface 123 as the interface unit, which communicates with each host 100 and sets the command multiplicity determined by the multiplicity determination processing program 302 for the host 100, sets the command multiplicity for the host 100 using the iSCSI standard control protocol according to which the target controls the maximum number of commands that can be sent by the initiator. However, the command multiplicity setting system in the invention is not limited to that described above, and wide variety of other systems can be utilized in the invention.

Furthermore, the aforementioned embodiments described the case where the command multiplicity assigned to the host 100 is updated at the point in time when the command processing program 301 processes the command from the host 100. However, the command multiplicity control method) in the invention is not limited to that described above. For example, the command multiplicity values assigned to the respective hosts 100 may be collectively determined on a periodic basis and then collectively set for the hosts 100.

Furthermore, the aforementioned embodiments have been explained for the case where the invention is applied in the storage apparatus 120. However, the invention is not limited to the above case. Wide variety of non-storage apparatuses, information processing apparatuses that execute processing in accordance with a command from each of hosts can be utilized in the invention.

Besides storage systems, wide variety of information processing systems, each of which includes plural hosts and an information processing apparatus that executes processing in accordance with a command sent from each host, can be utilized in the invention.

What is claimed is:

1. An information processing apparatus connected to plural hosts, for executing processing in accordance with a command sent from each host, the information processing apparatus comprising a multiplicity control unit that dynamically determines command multiplicity for the command to be assigned to the host in accordance with command issue frequency of the host and sets the determined multiplicity for the host, wherein the multiplicity control unit comprises:

a multiplicity determination processing unit for determining the command multiplicity assigned to the host in accordance with the command issue frequency of the host; and an interface unit for communicating with each host and setting the command multiplicity determined by the multiplicity determination processing unit for the corresponding host; and wherein the interface unit sets the command multiplicity determined by the multiplicity determination processing unit for the corresponding host using the iSCSI (internet Small Computer System Interface) standard control protocol according to which a target controls the maximum number of commands that can be sent by an initiator, wherein the multiplicity control unit includes a command processing unit for processing the command sent from the host; and wherein every time the command processing unit processes the command sent from the host, the multiplicity determination processing unit compares the command multiplicity assigned to the host with the number of commands for which no response has been made from among the commands sent from the host; and if the command multiplicity is larger than the number of commands for which no response has been made, the multiplicity determination processing unit decreases the command multiplicity assigned to the host by a predetermined number; and if the command multiplicity is equal to or less than the number of commands for which no response has been made, the multiplicity determination processing unit increases the command multiplicity assigned to the host by the predetermined number, thereby determining new command multiplicity to be assigned to the host.

2. The information processing apparatus according to claim 1, wherein the information processing apparatus is a storage apparatus that provides a data storage area to each host.

3. The information processing apparatus according to claim 1, wherein the predetermined number is 1.

4. The information processing apparatus according to claim 1, wherein the predetermined number is a numerical value set by a user.

5. The information processing apparatus according to claim 1, wherein: the multiplicity control unit has a receive command queue for temporarily storing the commands from each host;

the command processing unit processes the commands stored in the receive command queue in the order stored; and the multiplicity determination processing unit, when determining the new command multiplicity to be assigned to the host, increases the command multiplicity assigned to the corresponding host by the predetermined number only when the command multiplicity is equal to or less than the number of commands for which no response has been made and when the free capacity of the receive command queue is larger than the predetermined number.

6. A command multiplicity control method for controlling command multiplicity for each of plural hosts with respect to an information processing apparatus for executing processing in accordance with a command sent from each host, comprising:

a first step in which the information processing apparatus dynamically determines the command multiplicity to be assigned to the host in accordance with the command issue frequency of the host; and a second step in which the information processing apparatus sets the determined multiplicity for the host, wherein, in the first step, every time the command sent from the host is processed, the command multiplicity assigned to the host is compared with the number of commands, for which no response has been made from among the commands sent from the host; and if the command multiplicity is larger than the number of commands for which no response has been made, the command multiplicity assigned to the host is decreased by a predetermined number; and if the command multiplicity is equal to or less than the number of commands for which no response has been made, the command multiplicity assigned to the host is increased by the predetermined number, thereby determining new command multiplicity to be assigned to the host.

7. The command multiplicity control method according to claim 6, wherein the information processing apparatus is a storage apparatus that provides a data storage area to each host.

8. The command multiplicity control method according to claim 6, wherein, in the second step, the command multiplicity determined in the first step is set for the corresponding host using the iSCSI (internet Small Computer System Interface) standard control protocol according to which a target controls the maximum number of commands that can be sent by an initiator.

9. The command multiplicity control method according to claim 6, wherein the predetermined number is 1.

10. The command multiplicity control method according to claim 6, wherein the predetermined number is a numerical value set by an user.

11. The command multiplicity control method according to claim 6, wherein:

the information processing apparatus has a receive command queue for temporarily storing the commands from each host, and processes the commands stored in the receive command queue in the order stored; and in the first step, when determining the new command multiplicity assigned to the host, the command multiplicity assigned to the corresponding host is increased by the predetermined number only when the command multiplicity is equal to or less than the number of commands for which no response has been made and when the free capacity of the receive command queue is larger than the predetermined number.

* * * * *